US012755125B1

(12) United States Patent
Al-Mahdawi

(10) Patent No.: US 12,755,125 B1
(45) Date of Patent: Oct. 6, 2026

(54) CONTROLLED REDUCTION OF READ RANGE OF UHF RFID TAG

(71) Applicant: NEOLOGY, INC., Carlsbad, CA (US)

(72) Inventor: Tareef Al-Mahdawi, Escondido, CA (US)

(73) Assignee: NEOLOGY, INC., Carlsbad, CA (US)

( * ) Notice: Subject to any disclaimer, the term of this patent is extended or adjusted under 35 U.S.C. 154(b) by 0 days.

(21) Appl. No.: 19/170,566

(22) Filed: Apr. 4, 2025

(51) Int. Cl.
*B60L 53/62* (2019.01)
*G06K 19/07* (2006.01)
*G06K 19/077* (2006.01)

(52) U.S. Cl.
CPC ... *G06K 19/0726* (2013.01); *G06K 19/07786* (2013.01)

(58) Field of Classification Search
CPC ......... G06K 19/0723; G06K 19/07749; G06K 19/07773; G06K 19/0701; G06K 19/0726; G06K 19/077; G06K 19/07786
USPC ............................................ 235/492, 462.46
See application file for complete search history.

(56) References Cited

U.S. PATENT DOCUMENTS 10,079,704 B2 9/2018 Manku
2006/0132313 A1* 6/2006 Moskowitz ...... G06K 19/07345 343/750
2008/0018473 A1* 1/2008 Tsai ................ G06K 19/07749 340/572.7
2008/0238630 A1* 10/2008 Chen ................. G06K 19/0701 340/10.5
2013/0299579 A1 11/2013 Manku
2016/0012329 A1 1/2016 Machado et al.
2017/0193256 A1 7/2017 Jung et al.
2026/0014059 A1 1/2026 Barney et al.

FOREIGN PATENT DOCUMENTS

CN 112397874 A 2/2021
CN 112397874 B 3/2023
WO 2012082300 A1 6/2012
WO 2024025466 A1 2/2024

OTHER PUBLICATIONS

Non-Final Office Action for U.S. Appl. No. 19/269,824, mailed Sep. 15, 2025, 8 pgs.
Final Office Action for U.S. Appl. No. 19/269,824, dated Dec. 19, 2025, 11 pages.
Non-Final Office Action for U.S. Appl. No. 19/269,824, dated Apr. 30, 2026, 14 pages.

* cited by examiner

*Primary Examiner* — Daniel St Cyr
(74) *Attorney, Agent, or Firm* — Buchalter LLP

(57) ABSTRACT

An RFID tag antenna system comprises a tag antenna with complex impedance and an integrated circuit (IC) with input impedance. A controlled mismatch between the tag antenna and IC impedances reduces the realized gain of the tag antenna to a desired level. The system calculates a reflection coefficient to reduce antenna gain by a predetermined amount. A program converts the reflection coefficient to realized gain and calculates theoretical read distance based on realized gain and IC sensitivity. The process generates a read distance profile over frequency. This approach enables precise control of RFID tag performance, allowing customization for specific applications while maintaining optimal functionality.

16 Claims, 3 Drawing Sheets

CONTROLLED REDUCTION OF READ RANGE OF UHF RFID TAG

TECHNICAL FIELD

The embodiments described herein generally relate to radio-frequency identification (RFID) technology, and more particularly, to RFID tag antennas with controlled impedance mismatch for reduced read range in tolling applications.

BACKGROUND

Radio Frequency Identification (RFID) technology has become increasingly prevalent in various applications, including electronic toll collection systems. RFID systems typically consist of tags and readers, where the tags contain information that can be wirelessly transmitted to the readers when within range. In the context of tolling applications, RFID tags are commonly affixed to vehicles, allowing for automated identification and payment processing as vehicles pass through toll gates or designated areas.

The performance of RFID systems is heavily dependent on the read range, which is the maximum distance at which a tag can be reliably detected and read by a reader. The read range is influenced by several factors, including the sensitivity of the RFID chip, the antenna design, and the power output of the reader. As RFID technology has advanced, newer chips with higher sensitivity have been developed, leading to increased read ranges.

While longer read ranges can be beneficial in certain applications, they can pose significant challenges in RFID tolling systems. Excessive read ranges can negatively impact system performance when multiple tags are present in close proximity. Tags with exceptionally long read ranges may be detected prematurely or in adjacent lanes, causing operational issues and potentially leading to incorrect toll charges or system inefficiencies.

The problem of excessive read ranges is exacerbated by the advancement of RFID chips. As chip sensitivity improves, the read ranges naturally increase, which can be detrimental in tolling applications where precise detection within specific zones is crucial. This issue can lead to false readings, cross-lane interference, and reduced accuracy in vehicle identification and toll collection processes. This is because the tags with the excessive read ranges overwhelm the processes of reading existing weaker tags.

Traditional methods for controlling read ranges in RFID systems often involve adjusting the power output of the reader or modifying the physical characteristics of the tag antenna. However, these approaches may not always be feasible or cost-effective, particularly in large-scale tolling implementations where existing infrastructure and standardized equipment are already in place.

Some conventional solutions have attempted to address the issue by introducing external components to the RFID tag, such as attenuators or specialized materials to reduce the antenna's efficiency. However, these approaches can increase the complexity and cost of tag manufacturing, as well as potentially affecting the durability and longevity of the tags in real-world environments.

Another approach that has been explored involves the use of software-based filtering techniques to discard readings from tags that are detected outside the intended read zone. While this method can help mitigate some of the issues associated with excessive read ranges, it does not address the root cause of the problem and may still result in increased processing overhead and potential inaccuracies in high-traffic scenarios.

SUMMARY

Accordingly, systems, methods, and non-transitory computer-readable media are disclosed to control an antenna impedance mismatch for reduced read range in tolling applications without adding external components.

According to one aspect, an RFID tag antenna system comprises a tag antenna with complex impedance and an integrated circuit (IC) with input impedance. A controlled mismatch between the tag antenna and IC impedances reduces the realized gain of the tag antenna to a desired level. The system calculates a reflection coefficient to reduce antenna gain by a predetermined amount. A program converts the reflection coefficient to realized gain and calculates theoretical read distance based on realized gain and IC sensitivity. The process generates a read distance profile over frequency. This approach enables precise control of RFID tag performance, allowing customization for specific applications while maintaining optimal functionality.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

These flow charts provide a visual representation of the key processes involved in the invention, illustrating the steps for designing and optimizing the RFID tag antenna system

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

The embodiments described herein disclose systems and methods that effectively reduce the read range of RFID tags without introducing external components or relying solely on software-based filtering. Such solutions allow for compliance with read range requirements specific to tolling applications while maintaining operational efficiency and protecting the available bandwidth for reliable tag detection and communication. The systems and methods described provide an RFID tag antenna system with controlled impedance mismatch for optimizing read range and performance and offer a method for designing RFID tag antennas with reduced realized gain to achieve desired read distances. Other embodiments provide computer-implemented method for optimizing RFID tag antenna performance by generating read distance profiles over frequency ranges.

Figure 1:
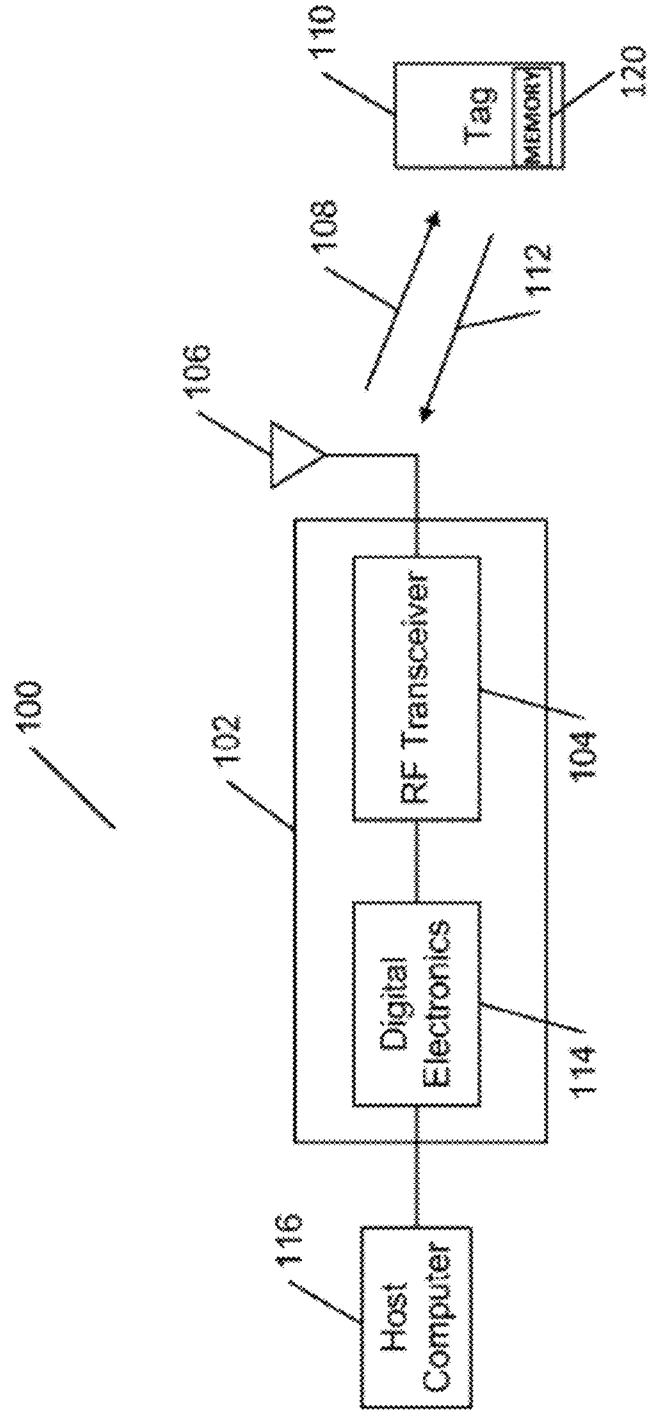
FIG. 1 shows a diagram illustrating an exemplary RFID system in accordance with one embodiment described herein.

FIG. 1 shows a diagram illustrating an exemplary RFID system 100 in accordance with one embodiment described herein. In system 100, RFID interrogator/reader 102 communicates with one or more RFID tags 110. Data can be exchanged between interrogator/reader 102 and RFID tag 110 via radio transmit signal 108 and radio receive signal 112. RFID interrogator/reader 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 and return signal 112 determines the operational range of RFID tag 110. RFID tag 110 can includes a memory 120 to store tag information and/or application-specific data. Data stored on memory 120 can be read by RFID interrogator/reader 102 through radio transit signal 108. Moreover, memory 120 can be written and/or updated by RFID interrogator/reader 102 with data embedded in radio transit signal 108.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. In some embodiments, RFID tag 110 and RFID interrogator/reader 102 are not in a fixed configuration, for example, RFID tag 110 can be installed on a vehicle while RFID interrogator/reader 102 is installed near a toll booth. In these embodiments, when RFID tag 110 passes within the range of the radio frequency electromagnetic field emitted by antenna 106 of RFID interrogator/reader 102, RFID tag 110 is excited and transmits data back to RF interrogator/reader 102. In other embodiments, RFID tag 110 and RFID interrogator/reader 102 are in a fixed configuration, for example, both RFID tag 110 and RFID interrogator/reader 102 can be installed on the same vehicle. In these embodiments, RFID tag 110 can be excited and transmit data back to RF interrogator/reader 102 when RFID interrogator/reader 102 is activated and begins to emit radio transit signal 108 through antenna 106. Alternatively, RFID tag 110 can be excited and allow data to be written into memory 120 when RFID interrogator/reader 102 is activated and begins to transmit data embedded in radio transit signal 108 through antenna 106.

In some implementations, in response to radio transit signal 108 transmitted by RF interrogator/reader 102 to access data stored on memory 120 of RFID tag 110, a change in the impedance of RFID tag 110 can be used to signal the data to RF interrogator/reader 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

But as explained below, when not shorted, the impedance can be controlled by design, without extra components, to create mismatch in order to control the power output of tag in order to control the read range of tag 110 for optimum performance in a multi tag environment such as tolling.

Digital electronics 114, which can comprise a microprocessor with RAM, performs decoding and reading of receive signal 112. Similarly, digital electronics 114 performs the coding of transmit signal 108. Thus, RF interrogator/reader 102 facilitates the reading or writing of data to RFID tags, e.g. RFID tag 110 that are within range of the RF field emitted by antenna 104. Together, RF transceiver 104 and digital electronics 114 comprise RF interrogator/reader 102. Finally, digital electronics 114 and can be interfaced with an integral display and/or provide a parallel or serial communications interface to a host computer or industrial controller, e.g. host computer 116.

In some embodiments, an RFID transponder (e.g., RFID tag 110 described with respect to FIG. 1) can be embedded in a vehicle's license plate to form an RFID-enabled license plate. However, vehicle license plates are most commonly made from metal (e.g., aluminum). Direct and uninsulated contact between an RFID transponder (single or multi-frequency) and a metal license plate (e.g., by applying the transponder directly onto the metal license plate) can short or severely detune the transponder's antenna(s), rendering the transponder virtually unreadable. Thus, in the exemplary embodiments described in more detail below, a transponder is embedded in a metal license plate in ways that neither compromise the performance of the transponder's antenna(s) nor add undesirable bulk to the license plate's usual dimensions. In some exemplary embodiments, an RFID-enabled license plate is configured to resonate at multiple frequencies (e.g., HF and UHF bands). In some embodiments, a resonator for the transponder is formed from the license plate itself if the license plate is metal. In other embodiments, whether the plate is metal or non-metal, the resonator can also be formed from a metalized layer (e.g., retro-reflective material, holographic foil, or any other appropriate metallic substrate) covering the license plate.

Thus, according to one embodiment, an RFID tag antenna system is provided comprising a tag antenna having a complex impedance, an integrated circuit (IC) having an input impedance, and a controlled mismatch between the tag antenna complex impedance and the IC input impedance. The controlled mismatch reduces a realized gain of the tag antenna to a desired level. The tag antenna complex impedance is represented as Za=Ra+jXa, where Ra is a real component and Xa is an imaginary component. The IC input impedance is represented as Zic=Ric+jXic, where Ric is a real component and Xic is an imaginary component.

The controlled mismatch in the RFID tag antenna system is achieved by designing the tag antenna to have a reflection coefficient that reduces the realized antenna gain by a predetermined amount. The reflection coefficient is represented as K=(Za−Zic*)/(Za+Zic), where Za is the tag antenna complex impedance and Zic is the IC input impedance. The system further comprises a program configured to convert the reflection coefficient to the realized gain.

The program in the RFID tag antenna system is further configured to calculate a theoretical read distance based on the realized gain and IC sensitivity. The theoretical read distance is calculated over a frequency range to generate a read distance profile, providing valuable information about the tag's performance across different frequencies.

Figure 2:
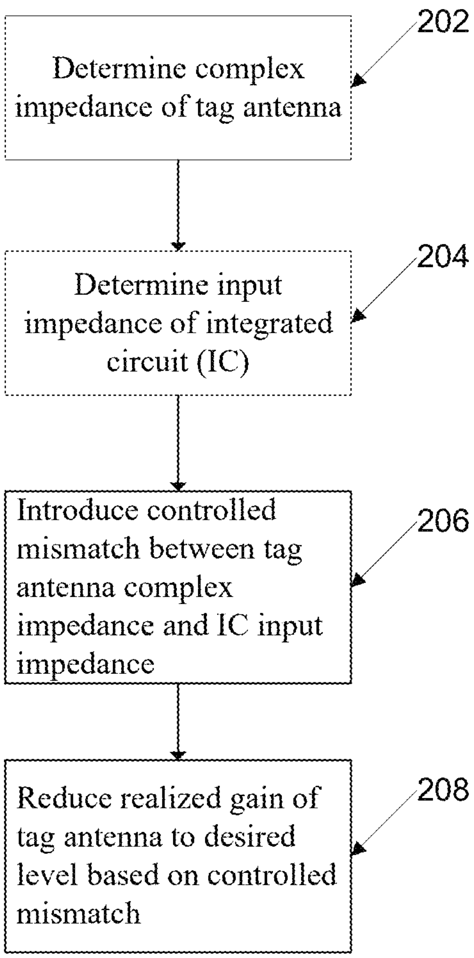
FIG. 2 is a flow chart illustrating the method for designing an RFID tag antenna system, in accordance with one example embodiment.

According to another embodiment, a method for designing an RFID tag antenna system is provided as illustrated in FIG. 2. The method comprises determining a complex impedance of a tag antenna in step 202, determining an input impedance of an integrated circuit (IC) in step 204, introducing a controlled mismatch between the tag antenna complex impedance and the IC input impedance in step 206, and reducing a realized gain of the tag antenna to a desired level based on the controlled mismatch in step 208.

Figure 3:
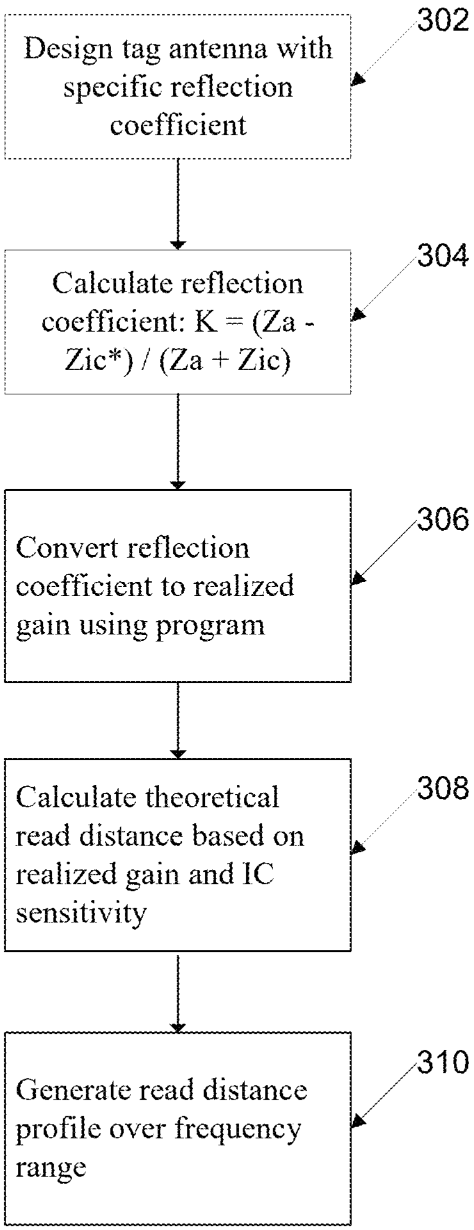
FIG. 3 is a flow chart detailing the method for designing an RFID tag antenna system, in accordance with one example embodiment.

A method for designing an RFID tag antenna system is illustrated in FIG. 3 and comprises introducing the controlled mismatch by designing the tag antenna to have a reflection coefficient that reduces the realized antenna gain by a predetermined amount in step 302. The reflection coefficient is calculated using the formula K=(Za−Zic*)/(Za+Zic), where Za is the tag antenna complex impedance and Zic is the IC input impedance as illustrated in step 304.

The method further comprises converting the reflection coefficient to the realized gain using a program as illustrated in step 306. Additionally, the method includes calculating a theoretical read distance based on the realized gain and IC sensitivity as illustrated in step 308. Then calculating the theoretical read distance involves generating a read distance profile over a frequency range, providing a comprehensive view of the tag's performance across different operating frequencies in step 310.

In another embodiment, a computer-implemented method for optimizing RFID tag antenna performance is provided. The method comprises receiving input parameters including a tag antenna complex impedance and an IC input impedance, calculating a reflection coefficient based on the tag antenna complex impedance and the IC input impedance, determining a realized gain of the tag antenna based on the reflection coefficient, calculating a theoretical read distance based on the realized gain and IC sensitivity, and generating a read distance profile over a frequency range.

The computer-implemented method for optimizing RFID tag antenna performance further comprises adjusting the tag antenna complex impedance to achieve a desired realized gain. Calculating the reflection coefficient involves using the formula K=(Za−Zic*)/(Za+Zic), where Za is the tag antenna complex impedance and Zic is the IC input impedance.

The computer-implemented method includes outputting the read distance profile for analysis, allowing designers to evaluate and optimize the tag's performance. The method also comprises iteratively adjusting the tag antenna complex impedance to optimize the read distance profile, enabling fine-tuning of the antenna design for specific applications.

The input parameters for the computer-implemented method further include frequency range information for generating the read distance profile. This allows for a comprehensive analysis of the tag's performance across different operating frequencies, ensuring optimal design for various use cases.

The systems and methods described herein provide an innovative approach to RFID tag antenna design by introducing controlled impedance mismatch, enabling precise control over read range and performance. The computer-implemented method offers a powerful tool for optimizing RFID tag antennas, resulting in improved efficiency and reliability in various applications.

The foregoing paragraphs have been provided by way of general introduction and are not intended to limit the scope of the following claims. The described embodiments, together with further advantages, will be best understood by reference to the following detailed description taken in conjunction with the accompanying drawings.

The preceding detailed description is merely exemplary in nature and is not intended to limit the embodiments described herein or the application thereof. The described embodiments are not limited to usage in conjunction with a particular type of tag. Hence, although the present embodiments are, for convenience of explanation, depicted and described as being implemented in an RFID tag antennas with controlled impedance mismatch for reduced read range in tolling applications, it will be appreciated that it can be implemented in various other types of RFID tags and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. An RFID tag antenna system comprising:

a tag antenna having a complex impedance based on a design of the tag antenna;

an integrated circuit (IC) having an complex input impedance; and wherein there is a controlled mismatch between the tag antenna complex impedance and the IC complex input impedance due to the design, wherein the controlled mismatch reduces a realized gain of the tag antenna to control the output of the RFID tag antenna system such that the read range is reduce to achieve optimum performance in a multi-tag environment, wherein the controlled mismatch is achieved by designing the tag antenna to have a reflection coefficient that reduces the realized antenna gain by a predetermined amount.

2. The RFID tag antenna system of claim 1, wherein the tag antenna complex impedance is represented as Za=Ra+jXa, where Ra is a real component and Xa is an imaginary component.

3. The RFID tag antenna system of claim 1, wherein the IC input impedance is represented as Zic=Ric+jXic, where Ric is a real component and Xic is an imaginary component.

4. The RFID tag antenna system of claim 1, wherein the reflection coefficient is represented as K=(Za−Zic*)/(Za+Zic), where Za is the tag antenna complex impedance and Zic is the IC input impedance.

5. The RFID tag antenna system of claim 1, further comprising a program configured to convert the reflection coefficient to the realized gain.

6. The RFID tag antenna system of claim 5, wherein the program is further configured to calculate a theoretical read distance based on the realized gain and IC sensitivity.

7. The RFID tag antenna system of claim 6, wherein the theoretical read distance is calculated over a frequency range to generate a read distance profile.

8. A method for designing an RFID tag antenna system, the method comprising:

determining a complex impedance of a tag antenna having an antenna design;

determining an complex input impedance of an integrated circuit (IC);

introducing a controlled mismatch between the tag antenna complex impedance and the IC complex input impedance via changes in the antenna design that reduces a realized gain of the tag antenna to a desired level based on the controlled mismatch to control the output of the RFID tag antenna system such that the read range is reduce to achieve optimum performance in a multi-tag environment, wherein introducing the controlled mismatch comprises designing the tag antenna to have a reflection coefficient that reduces the realized antenna gain by a predetermined amount, without introducing additional components.

9. The method of claim 8, further comprising calculating the reflection coefficient using the formula K=(Za−Zic*)/(Za+Zic), where Za is the tag antenna complex impedance and Zic is the IC input impedance.

10. The method of claim 8, further comprising converting the reflection coefficient to the realized gain using a program.

11. The method of claim 10, further comprising calculating a theoretical read distance based on the realized gain and IC sensitivity.

12. The method of claim 11, wherein calculating the theoretical read distance comprises generating a read distance profile over a frequency range.

13. A computer-implemented method for optimizing RFID tag antenna performance, the method comprising:

receiving input parameters including a tag antenna complex impedance and an IC input impedance;

calculating a reflection coefficient based on the tag antenna complex impedance and the IC input impedance;

determining a realized gain of the tag antenna based on the reflection coefficient;

calculating a theoretical read distance based on the realized gain and IC sensitivity;

generating a read distance profile over a frequency range; and adjusting the tag antenna complex impedance to achieve a desired realized gain that is reduced relative to a maximum realized gain to control the output of the RFID tag antenna system such that the read range is reduce to achieve optimum performance in a multi-tag environment.

14. The computer-implemented method of claim 13, wherein calculating the reflection coefficient comprises using the formula K=(Za−Zic*)/(Za+Zic), where Za is the tag antenna complex impedance and Zic is the IC input impedance.

15. The computer-implemented method of claim 13, further comprising outputting the read distance profile for analysis.

16. The computer-implemented method of claim 13, wherein the input parameters further include frequency range information for generating the read distance profile.

* * * * *